US012315997B2

(12) United States Patent
Bories et al.

(10) Patent No.: US 12,315,997 B2
(45) Date of Patent: May 27, 2025

(54) CONTROLLED-RADIATION ANTENNA SYSTEM

(71) Applicant: Commissariat à l'Energie Atomique et aux Energies Alternatives, Paris (FR)

(72) Inventors: Serge Bories, Grenoble (FR); Antonio Clemente, Grenoble (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 190 days.

(21) Appl. No.: 18/057,600

(22) Filed: Nov. 21, 2022

(65) Prior Publication Data

US 2023/0170610 A1 Jun. 1, 2023

(30) Foreign Application Priority Data

Dec. 1, 2021 (FR) ...................................... 2112800

(51) Int. Cl.
*H01Q 1/52* (2006.01)

(52) U.S. Cl.
CPC .................................. *H01Q 1/523* (2013.01)

(58) Field of Classification Search
CPC .......... H01Q 19/28; H01Q 3/446; H01Q 3/24; H01Q 21/29; H01Q 19/00; H01Q 1/521-523; H01Q 1/243; H01Q 21/06; H01Q 5/378-392
See application file for complete search history.

(56) References Cited

U.S. PATENT DOCUMENTS 1,860,123 A * 5/1932 Yagi ........................ H01Q 3/44 343/837
4,700,197 A * 10/1987 Milne .................... H01Q 3/446 343/837
5,767,807 A * 6/1998 Pritchett ................. H01Q 3/24 343/834
6,104,935 A * 8/2000 Smith .................... H01Q 1/246 455/562.1
6,407,719 B1 * 6/2002 Ohira ....................... H01Q 3/44 343/893

(Continued)

FOREIGN PATENT DOCUMENTS

CN 108987949 A * 12/2018 ............... H01Q 1/36
EP 2178163 A1 * 4/2010 ............ H01Q 19/28

(Continued)

OTHER PUBLICATIONS

Preliminary Search Report for French Application 2112800 dated Jul. 14, 2022, 2 pages.

*Primary Examiner* — Hai V Tran
*Assistant Examiner* — Jordan E. DeWitt
(74) *Attorney, Agent, or Firm* — Jordan IP Law, LLC

(57) ABSTRACT

The present description concerns an antenna system comprising a transmitting or receiving antenna element (12), an array of parasitic antenna elements (14), individually associated with reconfigurable loads (15), one or a plurality of near-field antennas (32), and a circuit (18, 34) for setting the configuration of the array of parasitic antenna elements according to a radiation picked up by the near-field antenna (s) during a radio frequency transmission by the transmitting or receiving antenna element.

8 Claims, 4 Drawing Sheets

(56) References Cited

U.S. PATENT DOCUMENTS 6,515,635 B2 * 2/2003 Chiang .................. H01Q 3/242 343/837
7,362,266 B2 * 4/2008 Collinson .............. H01Q 3/267 242/174
8,004,456 B2 * 8/2011 Scott ...................... H01Q 3/267 342/174
8,106,838 B2 * 1/2012 Man ......................... H01Q 5/20 343/702
8,319,686 B2 * 11/2012 Park ....................... H01Q 19/32 342/359
8,514,130 B1 * 8/2013 Jensen ................... H01Q 19/32 342/367
9,190,733 B2 * 11/2015 Desclos ................... H01Q 9/42
9,263,798 B1 * 2/2016 Piazza .................... H01Q 21/29
9,319,904 B1 * 4/2016 Srinivasa ................ H04L 43/12
9,608,331 B1 * 3/2017 Rowson ................... H01Q 9/16
10,109,909 B1 * 10/2018 Rowson ................... H01Q 9/42
10,355,358 B2 * 7/2019 Desclos ................. H01Q 5/328
10,469,183 B1 * 11/2019 Kuo ....................... H04B 17/21
2002/0171583 A1 * 11/2002 Purdy .................... H01Q 25/00 342/368
2003/0030594 A1 * 2/2003 Larry ..................... H01Q 3/267 343/895
2004/0066341 A1 * 4/2004 Ito .......................... H01Q 21/24 343/702
2004/0257292 A1 * 12/2004 Wang ................... H01Q 15/148 343/834
2006/0227062 A1 * 10/2006 Francque ............... H01Q 1/523 343/893
2006/0273959 A1 * 12/2006 Kawasaki .............. H01Q 3/267 342/368
2008/0232448 A1 * 9/2008 Baker ..................... H03L 7/085 375/219
2009/0153394 A1 * 6/2009 Navarro ................ G01S 7/4017 342/174
2009/0267824 A1 * 10/2009 Cooper .................. H01Q 3/267 342/174
2011/0279320 A1 * 11/2011 Dumon .................. H01Q 3/267 342/368
2011/0309980 A1 * 12/2011 Ali ......................... H01Q 1/245 342/368
2012/0027066 A1 * 2/2012 O'Keeffe ............... H01Q 1/246 375/224
2012/0161931 A1 * 6/2012 Karmakar ............. G01S 13/825 235/492
2013/0023218 A1 * 1/2013 Ali ......................... H01Q 19/30 455/67.14
2013/0147664 A1 * 6/2013 Lin ...................... H01Q 13/085 342/368
2013/0162496 A1 * 6/2013 Wakabayashi ........... H01Q 1/38 343/893
2014/0269449 A1 * 9/2014 Abramsky ................ H04L 5/14 370/278
2014/0334565 A1 * 11/2014 Tzanidis .............. H01Q 21/062 375/267
2015/0109181 A1 * 4/2015 Hyde ................. H01Q 15/0086 343/833
2015/0115978 A1 * 4/2015 Bories ................... G01S 7/4021 324/601
2015/0138026 A1 * 5/2015 Shay ...................... H04B 17/12 343/703
2015/0222020 A1 * 8/2015 Tai ........................... H01Q 9/42 343/745
2015/0349418 A1 * 12/2015 Patron ...................... H01Q 3/44 343/836
2016/0037022 A1 * 2/2016 Matsuzaki ............. H04N 5/211 348/335
2016/0126627 A1 * 5/2016 Lee ........................ G05B 15/02 342/368
2017/0047665 A1 * 2/2017 Yang .................... H01Q 19/005
2017/0199134 A1 * 7/2017 LoVetri ................ A61B 5/0536
2017/0294706 A1 * 10/2017 Koga ...................... H04M 1/02
2018/0062257 A1 * 3/2018 Kausar ................... H01Q 1/243
2018/0269857 A1 * 9/2018 Zachara .................... H03J 3/02
2018/0351255 A1 * 12/2018 Singh ................... H01Q 3/2629
2019/0215765 A1 * 7/2019 Ramasamy ......... H04W 52/243
2019/0267707 A1 * 8/2019 Khalil ................ H01Q 21/0025
2019/0312347 A1 * 10/2019 Edwards .............. H01Q 9/0435
2021/0305715 A1 * 9/2021 Obeidat ................. H01Q 1/007
2021/0336337 A1 * 10/2021 Obeidat ................. H01Q 19/30
2021/0384629 A1 * 12/2021 Murch ................. H01Q 21/062
2023/0061805 A1 * 3/2023 Singh .................. H01Q 19/005
2023/0170610 A1 * 6/2023 Bories .................... H01Q 3/446 343/770
2023/0282975 A1 * 9/2023 Dawson ............... H01Q 3/2611 342/372

FOREIGN PATENT DOCUMENTS

EP 3499640 A1 * 6/2019 ........... H01Q 13/103
FR 3106240 A1 * 7/2021 ........... H01Q 15/147
WO WO-2014165320 A2 * 10/2014 ............. H01Q 5/328
WO WO-2015023801 A1 * 2/2015 ............. H01Q 1/525

* cited by examiner

CONTROLLED-RADIATION ANTENNA SYSTEM

FIELD

The present disclosure generally concerns antenna arrays and more particularly compact and directional antennas. The present disclosure more particularly applies to reconfigurable antenna arrays.

BACKGROUND

Antenna arrays are widely used in radio frequency detection or transmission systems, particularly in telecommunication systems.

Antennas called directional or super directional are based on an array of antenna elements. They are generally formed from an array of antenna elements where the antennas are weighted and configured to focus the beam in a given direction. This may be implemented in the form of an architecture with parasitic elements (a single antenna, excited by a generator, which is coupled to one or a plurality of antennas called parasitic, coupled to a given load condition) or of an architecture based on the control of the amplitude and the phase associated with each element of the antenna array. Antenna architectures with parasitic elements use the couplings and interferences between the different antenna elements to set the radiation pattern of the antenna with a main lobe (useful) in a given direction (unidirectional antenna) and having a given angular width, or a plurality of useful lobes in different directions (multidirectional antenna).

Such antennas are particularly sensitive to their environment, which is likely to generate distortions in the radiation pattern of the antenna. This problem is all the more critical as the antenna has a small electric size (physical size to the wavelength). Further, the smaller the antenna, the more sensitive it is to interferences of its close environment. For example, in a telephone-type telecommunication device, such an antenna is sensitive to interferences generated by motions of the hand or changes in the position of a user's body with respect to the antenna.

Antenna array calibration systems which modify the weighting coefficients of the antenna elements according to operating conditions during antenna calibration phases have already been provided.

Document US 2015/0115978 describes an antenna system where an array of electro-optical probes distributed in the radome of the antenna is used in calibration phases during which a distinct antenna, dedicated to the calibration, transmits. The coefficients associated with each antenna elements are set, during this calibration phase, according to the signals received by the different antenna elements and to signals retromodulated by the electro-optic probes.

Document US 2016/0036127 describes a reconfigurable antenna system, where a frequency reconfigurable antenna is associated with parasitic transmitting elements to set the directionality. These elements are associated with measurement components for the impedance matching and to other setting elements to adjust the radiation pattern. These measurements and settings however are not accompanied by a feedback for the readjustment of the loads which control the radiation pattern.

Known calibration systems are not adapted to a setting in real time of the radiation pattern, in particular when they require a transmitting element dedicated to the calibration.

Now, such an adjustment would be desirable particularly for antennas sensitive to close environmental interferences.

Further, the accuracy required for the adjustment of the amplitude and phase weighting coefficients of the different antenna elements due to the miniaturization of antennas makes indirect measurement solutions (impedance measurement) unsuitable.

SUMMARY

There is a need for a directional or super directional transmitting or receiving antenna adapted to being adjusted in real time.

There is a need for a reconfigurable antenna having its settings performed based on direct radiation measurements.

An embodiment overcomes all or part of the disadvantages of known reconfigurable antenna arrays.

An embodiment provides an antenna system comprising:

a transmitting or receiving antenna element;

an array of parasitic antenna elements individually associated with reconfigurable loads;

one or a plurality of near-field antennas; and a circuit for setting the configuration of the array of parasitic antenna elements according to a radiation picked up by the antenna(s) in near field during a radio frequency transmission by the transmitting or receiving antenna element.

According to an embodiment, the circuit is configured to adjust impedance values of the reconfigurable loads according to a comparison, with reference data, of data representative of a radiation pattern of the system.

According to an embodiment, the reference data are representative of radiation patterns of the system in the presence of interferences.

According to an embodiment, the spacing between two antenna elements is smaller than one quarter of the wavelength of the central frequency of the bandwidth for which the array is intended.

According to an embodiment, the spacing between each near-field antenna and the closest antenna element is smaller than one tenth of the wavelength of the central frequency of the bandwidth for which the array is intended.

According to an embodiment, the system comprises exactly eight parasitic antenna elements equidistant from the transmitting or receiving antenna element and distributed every 45° around said element.

According to an embodiment, the transmitting or receiving antenna element and the array of parasitic antenna elements individually associated with the reconfigurable loads form part of a reconfigurable array of antenna elements.

An embodiment provides a method of configuration of the antenna system such as described, comprising the following steps:

a) identifying, from among a set of reference data, reference data which are the closest possible to data representative of a radiation pattern of the system; and b) adjusting impedance values of the reconfigurable loads according to the identified reference data.

According to an embodiment, the reference data are representative of radiation patterns of the system in the presence of interferences.

According to an embodiment, at step b), the impedance values of the reconfigurable loads are adjusted to reference values associated with the reference data identified at step a).

According to an embodiment, the method further comprises, prior to step a), a step of recording of the reference data, said data being representative of radiation patterns of the system in the presence of interferences.

BRIEF DESCRIPTION OF THE DRAWINGS

The foregoing and other features and advantages of the present invention will be discussed in detail in the following non-limiting description of specific embodiments and implementation modes in connection with the accompanying drawing, in which.

DETAILED DESCRIPTION OF THE PRESENT EMBODIMENTS

Figure 1:
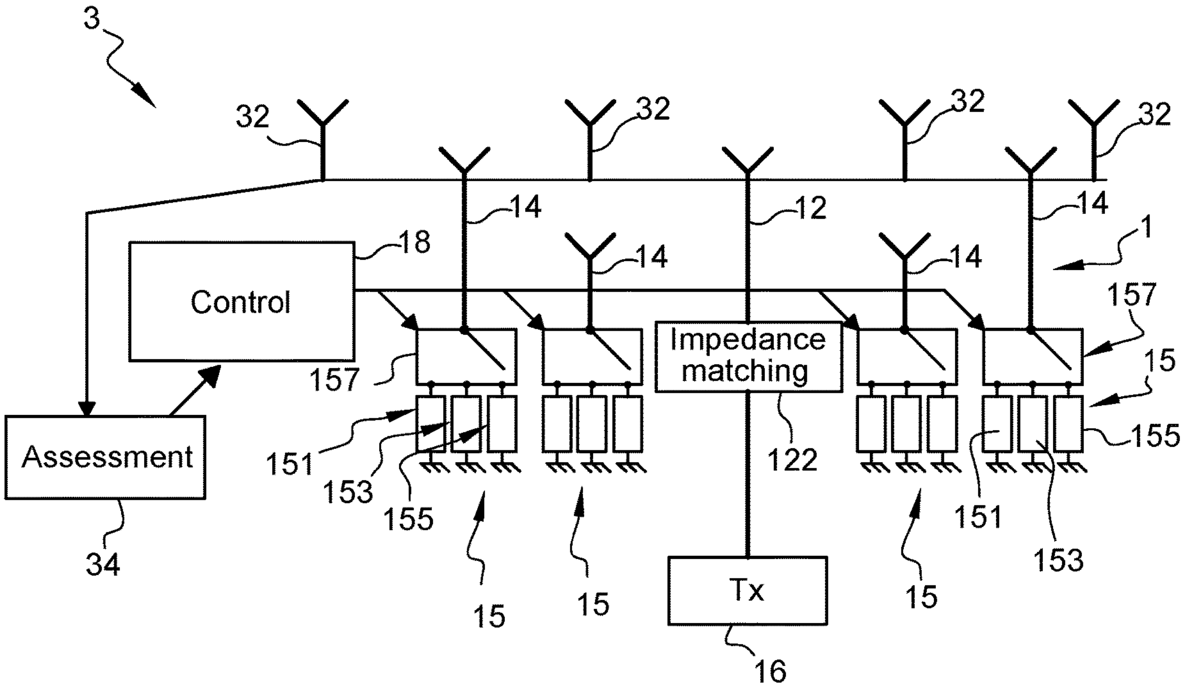
FIG. 1 very schematically shows an embodiment of an antenna system.

Like features have been designated by like references in the various figures. In particular, the structural and/or functional elements common to the different embodiments and implementation modes may be designated with the same reference numerals and may have identical structural, dimensional, and material properties.

For clarity, only those steps and elements which are useful to the understanding of the described embodiments and implementation modes have been shown and will be detailed. In particular, the applications likely to implement the reconfigurable antenna arrays of the present disclosure are not detailed, the described embodiments and implementation modes being compatible with usual applications implementing reconfigurable antenna arrays.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following description, when reference is made to terms qualifying absolute positions, such as terms “front”, “back”, “top”, “bottom”, “left”, “right”, etc., or relative positions, such as terms “above”, “under”, “upper”, “lower”, etc., or to terms qualifying directions, such as terms “horizontal”, “vertical”, etc., it is referred, unless specified otherwise, to the orientation of the drawings.

Unless specified otherwise, the terms “about”, “approximately”, “substantially”, and “in the order of” signify within 10%, preferably within 5%.

According to the described embodiments and implementation modes, it is provided to associate, with an array of antenna elements forming a reconfigurable directional antenna, elements for measuring the near-field radiation around the antenna array.

Reconfigurable super directional antennas can be distributed into three categories according to the nature of the system setting the directionality.

A first category concerns antennas with parasitic elements, in which a single one of the elements of the antenna array is active (that is, excited by the radio frequency signal to be transmitted, or useful signal, and/or coupled to a detector of the picked-up radiation), while the other elements of the array are loaded with impedances calculated to provide the active element with a desired radiation lobe. Typically, the secondary antenna elements are associated with loads having impedances determined according to the desired parasitic contributions on the main antenna element to concentrate the lobe of the main antenna in the desired direction.

A second category concerns antennas formed of a digital phased array, where each antenna element is coupled to a radio frequency transmit-receive chain. Individual amplitude and phase weighting coefficients are assigned to each antenna element in baseband (upstream of the amplifier and of the phase shifter of each antenna) so that the array has a desired directionality.

A third category concerns antennas formed of an analog phased array in which, like for the digital phased array, each antenna element transmits and/or receives a portion of the useful signal. However, in the case of analog phased array antennas, the power division and the amplitude and phase weightings assigned to each element are performed at the level of each antenna element, by a setting of the amplifier and of the phase shifter which are associated therewith.

The diameter of the antenna array is called “compact” if the radial spacing between the central element and the parasitic elements if smaller than 0.25λ, (lambda), where lambda represents the wavelength of the central frequency of the operating frequency band of the antenna array.

In the following description, an antenna array according to the first category, that is, an array where a single one of the antenna elements is active by being connected to the radio frequency transmitter and transmits or interprets the useful signal, will be taken as an example.

FIG. 1 very schematically shows an embodiment of a radio frequency transmission antenna system.

This system comprises an array 1 of antenna elements geometrically distributed in space. Taking the example of an array with a single active element, array 1 comprises a transmitting element or antenna 12 and a plurality of elements or antennas 14 distributed around element 12. To form a super directional antenna, elements 12 and 14 are preferably arranged with respect to one another with distances between elements in the range from 0.5λ to 0.2λ, more preferably in the range from 0.25λ to 0.5λ, where λ (lambda) represents the wavelength of the central frequency of the operating frequency band of the antenna. In other words, the spacing between two antenna elements 12, 14 of array 1 is smaller than half, preferably smaller than one quarter, of the wavelength λ of the central frequency of the bandwidth for which the array is intended.

According to a preferred embodiment, elements 14 are preferably substantially equidistant from element 12 and regularly distributed around element 12. Elements 14 are for example located on the contour of a circle centered on element 12 and distributed at regular intervals on the contour of this circle. Array 1 comprises, preferably, eight elements 14 equidistant from element 12. In this case, elements 14 are distributed every 45° around element 12.

Transmitting element 12 is coupled, preferably via an impedance matching array 122 (impedance matching), to an electronic transmission circuit 16 (Tx). Usual elements (not shown) transmit to circuit 16 radio frequency signals to be transmitted according to the application. In the embodiments more particularly targeted by the present disclosure, the central frequency of the transmission frequency band is in the order of one gigahertz, preferably of a value in the range from 100 MHz to 7 GHz.

Each parasitic element 14 is associated with a configurable load 15, preferably formed of switchable passive components to form impedances of variables values. In the example of FIG. 1, each configurable load 15 is symbolized by three impedances 151, 153 and 155, coupled on the one hand to ground and, on the other hand, individually to a selector 157 of connection of one of the impedances 151, 153, and 155 to the associated parasitic antenna element 14. Although three impedances 151, 153, and 155 have been shown for each configurable load 15 in FIG. 1, it is obvious that configurable loads 15 may each comprise any number of impedances. Each selector 157 is individually controllable from an electronic digital central frequency and beam direction control circuit 18 (Control).

This is an example only and any usual configurable parasitic load structure may be used. A variant where the impedances 151, 153, and 155 of all or part of the configurable loads 15 are replaced with a single component having a variable impedance may in particular be provided. Selector 157 can then be omitted, the variable impedance component being in this case connected on the one hand to ground and, on the other hand, directly to the element 14 which is associated therewith.

The architecture described up to now in relation with FIG. 1 may be replaced with any antenna system with a reconfigurable antenna array, be it with parasitic elements or with a phased array of a plurality of active antenna elements.

According to the described embodiments, it is provided to associate, with reconfigurable array 1 of antenna elements, a device 3 comprising one or a plurality of near-field antennas 32 for measuring the radiation emitted by array 1. Each near-field antenna 32 is coupled to an electronic circuit 34 (Assessment) for assessing the near-field radiation.

The results provided by the near-field radiation measurements are interpreted by circuit 34 to supply, to circuit 18, setting parameters for the different loads 15. A feedback loop is thus created in a way to control the radiation of the antenna array based on desired radiation parameters (radiation pattern). In a practical implementation, circuits 18 and 34 may be confounded and comprise a microcontroller for implementing a program or algorithm of interpretation of the measurements of the signals picked up by antennas 32 and of determination of the parameters of loads 15.

By "near-field", there is meant a measurement of the electromagnetic field performed at a very short distance (in the order of from ten times to twenty times shorter) with respect to the wavelength λ corresponding to the central frequency of the bandwidth for which the array is intended. This distance for example corresponds to a spacing between the antenna elements 14 associated with configurable loads 15 to form the beam. Typically, it is considered that the responsive area around an antenna, that is, its sensitivity to the presence of interfering elements such as a hand, is in the order of $\lambda/2\pi$, that is, approximately $\lambda/6$. Thus, according to a preferred embodiment, each antenna 32 is arranged at a maximum distance of approximately $\lambda/10$ from the antenna element 12 or 14 which is closest thereto. In other words, the spacing between each near-field antenna and the antenna element 12 or 14 closest to array 1 is smaller than one tenth of the wavelength of the central frequency of the bandwidth for which the array is intended. Probes or antennas 32 may be arranged uniformly or non-uniformly around the antenna system, for example according to the type of radiation to be sampled.

As a specific example of embodiment, for an antenna system adapted to an operating frequency in the order of one gigahertz, the antenna elements 12 and 14 of antenna array 1 are spaced apart from one another by a maximum distance in the order of a few (less than 10) centimeters. Antennas 32 are respectively spaced apart from the antenna element 12 or 14 which is closest thereto by a distance of from approximately a few millimeters to a few centimeters.

According to the described embodiments, the respective distances between antennas 12, 14, and 32 are fixed. Thus, even if antennas 32 have an impact on the radiation pattern of the system, it is easy to take into account these parameters in the algorithm of analysis of the radiations picked up by near-field antennas 32.

Preferably, in an antenna array with passive parasitic elements, the number of antennas 32 is smaller than or equal to the number of parasitic antenna elements 14 and each antenna 32 is associated with a parasitic antenna element 14. In an array of antennas with active or reconfigurable antenna elements, the number of antennas 32 is preferably equal to the number of antenna elements 12 and 14 of array 1.

Figure 2:
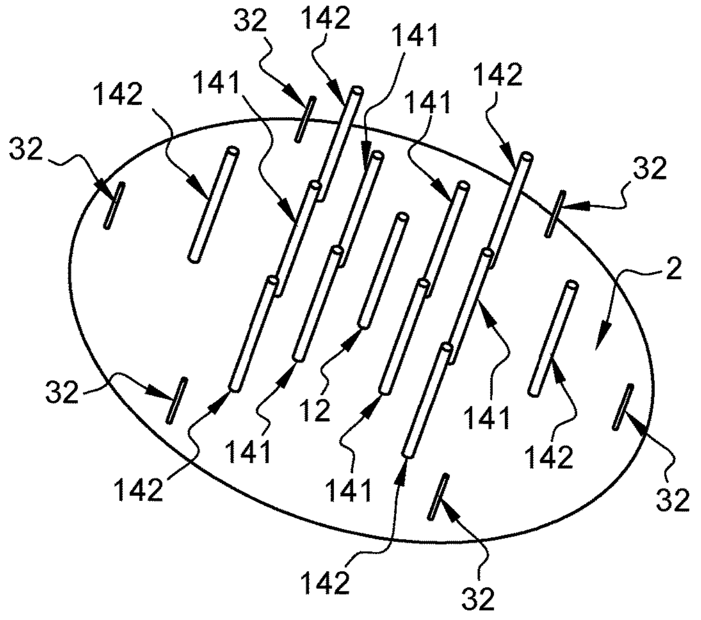
FIG. 2 is a simplified perspective view of an embodiment of an arrangement of antennas in an antenna system of the type of that in FIG. 1.

FIG. 2 is a simplified perspective view of an embodiment of an arrangement of antennas in an antenna system of the type of that of FIG. 1.

According to this embodiment, there are provided between four and twelve (twelve in the representation of FIG. 2) antenna elements 14 distributed in a first group of six antenna elements 141 and a second group of six antenna elements 142, arranged on two concentric circles around antenna element 12. A number of antennas 32 which is a function of the number of antenna elements 141 or 142, for example, from four to twelve (six in the representation of FIG. 2) is also provided. Antennas 32 are distributed on a third concentric circle external to the circles of elements 141 and 142.

Figure 3:
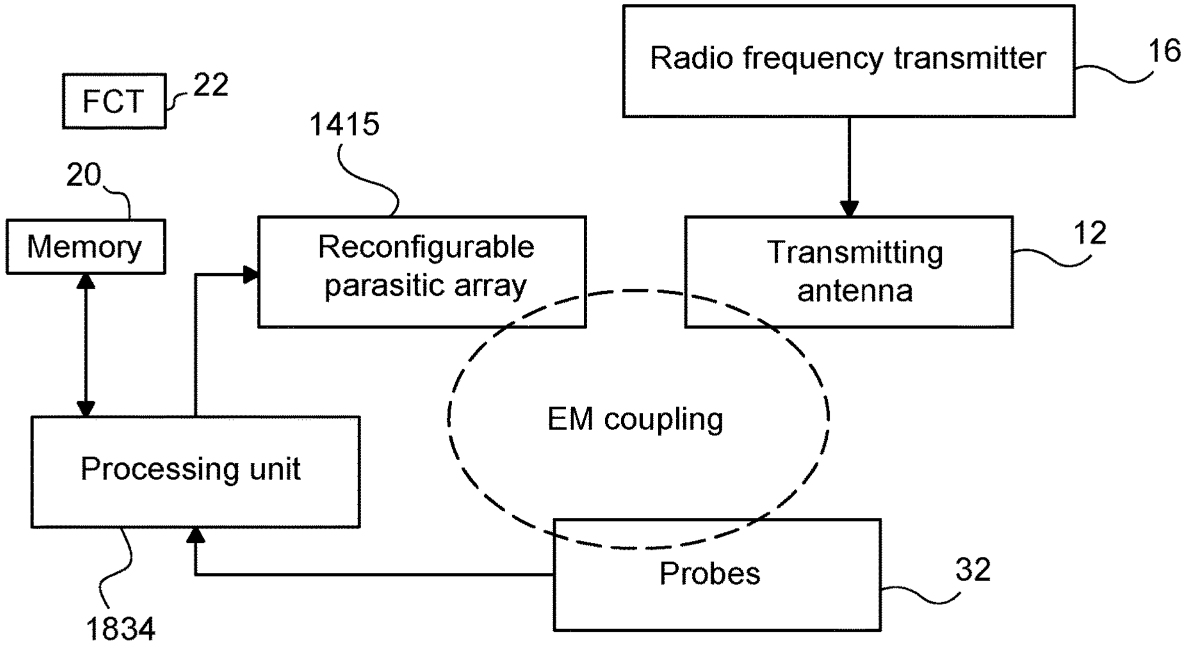
FIG. 3 very schematically shows in the form of blocks an example of functional architecture of an embodiment of an antenna system.

FIG. 3 very schematically shows in the form of blocks an example of functional architecture of an embodiment of an antenna system.

This drawing illustrates the main interacting elements of the antenna system.

One can find:

- electronic transmission circuit 16 (Radio frequency transmitter) coupled to transmitting antenna 12 (Transmitting antenna);
- an array 1415 (Reconfigurable parasitic array) of reconfigurable parasitic elements (elements 14 and loads 15, FIG. 1);
- an array of antennas or near-field probes 32 (Probes); and
- electronic circuits 1834 (Processing unit) fulfilling, among others, the functions of interpretation of the measurements of the signals picked up by antennas 32 and of determination of the parameters of the loads of array 1415.

In the shown example, the system further comprises a memory 20 (Memory). Memory 20 for example comprises at least one non-volatile storage memory region and at least another volatile storage memory region.

The system may also comprise one or a plurality of other elements. These elements are symbolized, in FIG. 2, by a functional block 22 (FCT).

As illustrated in FIG. 3, antenna 12, the elements 14 of parasitic array 1415, and probes 32 are in an electromagnetic coupling relation (EM coupling).

Figure 4:
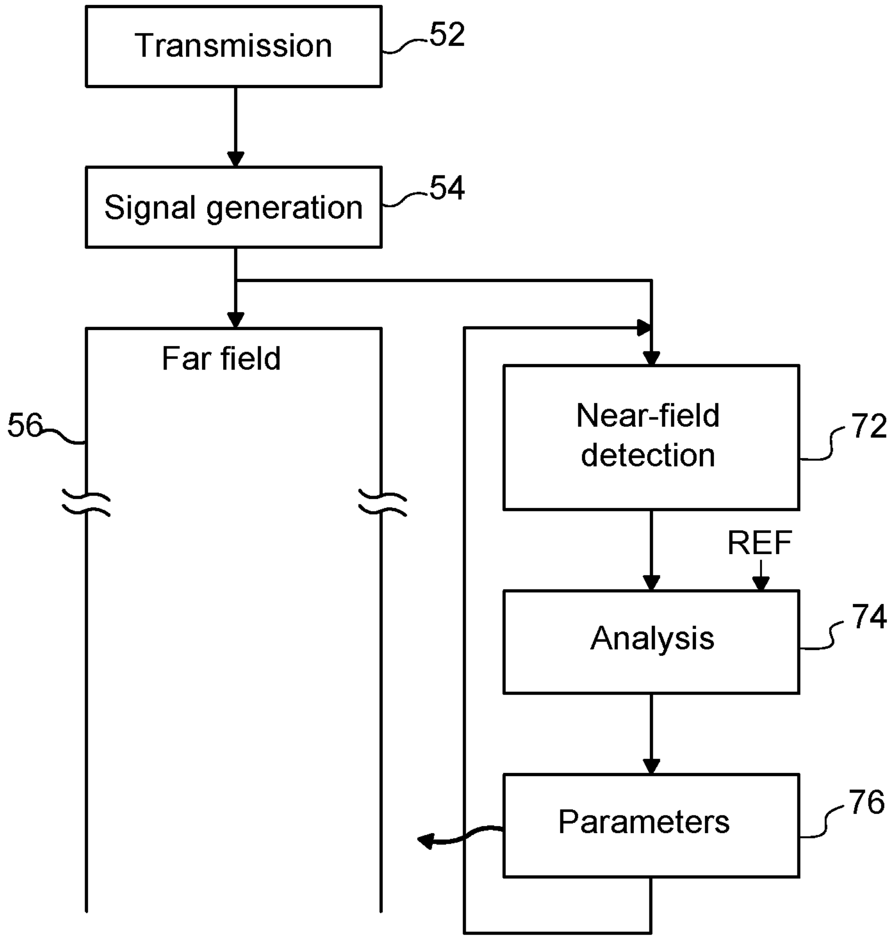
FIG. 4 very schematically shows in the form of blocks an implementation mode of a method of controlling parameters of the antenna elements of an antenna system.

FIG. 4 very schematically shows in the form of blocks an implementation mode of a method of controlling parameters of the antenna elements 14 of array 1 on set point values (REF) for a given radiation pattern of array 1.

When the antenna system enters a transmission mode (block 52, Transmission), circuit 16 is activated and generates a radio frequency signal (block 54, Signal generation). This results in a far-field transmission (block 56, Far field) by the array according to a radiation pattern conditioned by the parameters of parasitic antennas 14. By far field, there is meant at a distance from the system greater than some ten meters.

In parallel, the electromagnetic field emitted in the immediate vicinity of array 1 is picked up (block 72, Near-field detection) by antennas 32, and the measured signals are sent by the latter to circuit 34. Circuit 34 then performs an analysis (block 74, Analysis) of these signals with respect to reference or set point values (REF). If the signals measured by antennas 32 differ from the reference values, circuit 34 orders (block 76, Parameters), via circuit 18, the reconfiguration of the load impedances 151, 153, and 155 connected to antenna elements 14.

The modification of the parameters of parasitic antennas 14, or of their immediate context, is immediate and thus modifies the radiation pattern of system 1. The steps of detection 72, or analysis 74, and of setting 76 are preferably carried out in a loop (looping back of the output of block 76 onto the input of block 72) as long as array 1 is transmitting. Thus, it is possible to provide, at the level of the algorithm of analysis and determination of the control parameters of configurable loads 151, 153, and 155, results in the form of progressive increases or decreases of such or such impedance of each configurable load.

Figure 5:
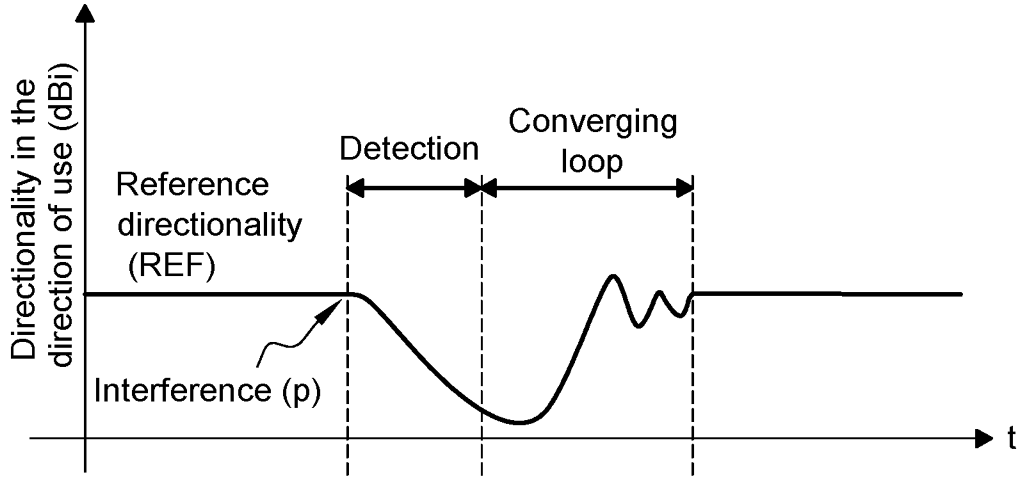
FIG. 5 very schematically illustrates in a timing diagram the implementation of the control of the setting of a configurable antenna array.

FIG. 5 very schematically illustrates in a timing diagram the implementation of the control of the setting of a reconfigurable antenna array.

This drawing shows, in simplified fashion, an example of interference of a main emission lobe with respect to a set point or reference level REF (Reference directionality (REF)). Assuming the arrival of an interference p (Interference (p)), for example, the motion of a hand, in the system environment, this interference p translates as a deformation of the radiation pattern of array 1, or of the direction of the lobe, or also of the directionality (Directionality in the direction of use (dBi)). The implementation of the steps of measurement (Detection) and analysis of the radiation picked up by near-field antennas 32 corrects (Converging loop) this drift by modifying the parameters of the reconfigurable array (loads 151, 153, and 155) of antennas 1 to recover reference direction REF.

The number of points of measurement of the near-field radiation, and thus of antennas 32, depends on the application and, particularly, on the desired resolution or fineness in the number of interference situations to be characterized.

An advantage of the described system lies in the fact that it allows a real-time control of the transmitting antenna array. Indeed, the measurements of the signals picked up by the antennas 32 of device 3 as well as the analysis and the interpretation performed by circuit 34 require no specific intervention of the transmitting system. It is sufficient for the latter to be transmitting.

Another advantage lies in the fact that a real-time control also enables to compensate for possible variations of the radiation pattern due to variations of operating conditions such as temperature.

As compared with a system with optical probes, an advantage of the described system is that it requires no transmission by a specific antenna.

However, although the described system has a particularly high performance to set a transmitting antenna array, it may as a variant be implemented for a receiving antenna array. In this case, an operating phase during which the system switches to the transmission of a signal by antenna array 1 is periodically provided. Preferably, to avoid disturbing the reception, it is provided for such a transmission and setting phase to be performed with a duty cycle (duration of the transmission phase with respect to its periodicity) smaller than 10%, preferably smaller than 1%, or for example for 1 ms every 100 ms.

An antenna system such as described is particularly advantageous in applications such as antenna array diagnosis applications, RFID-type radio frequency communication applications using multiple-standard miniature readers, applications of electromagnetic compatibility measurement equipment, or antennas for test chambers, miniature directional radars, compact super directional antennas, etc.

Figure 6:
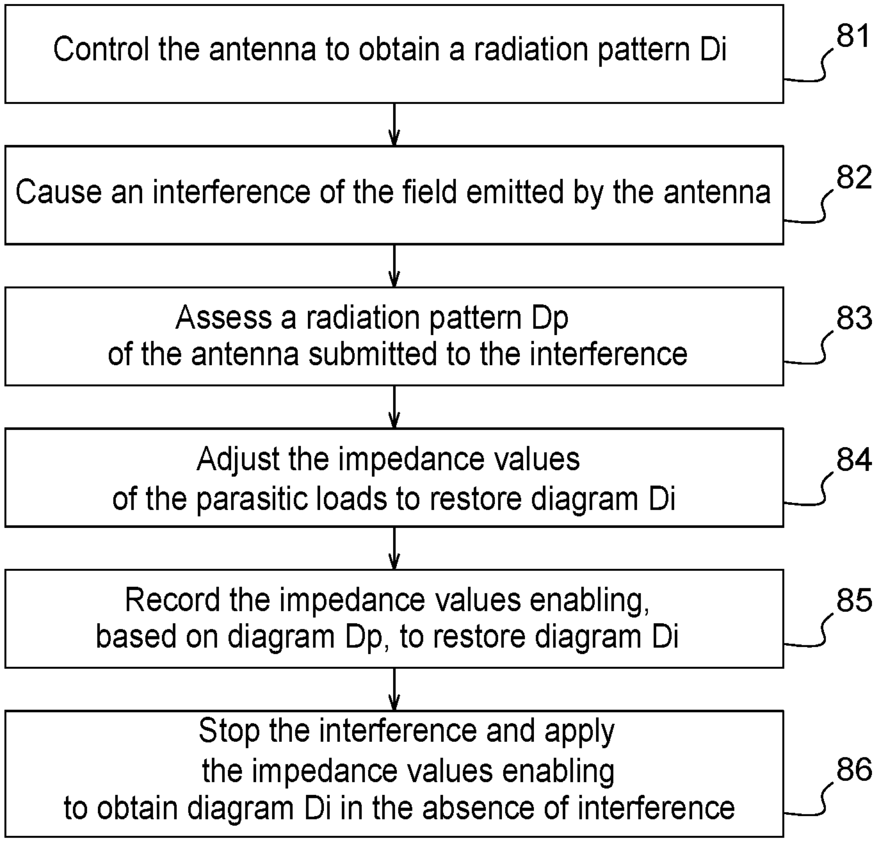
FIG. 6 is a diagram illustrating an implementation mode of a training method.

FIG. 6 is a diagram illustrating an implementation mode of a training method. As an example, a non-volatile storage memory region of memory 20 (FIG. 3) stores program code instructions which, when they are executed by processing unit 1834, enable the implementation of this method.

At a first step (block 81, Control the antenna to obtain a radiation pattern Di), antenna 12 is controlled (FIG. 1) so that array 1 emits an electromagnetic field having a radiation pattern Di. Diagram Di for example corresponds to a situation where the field emission by array 1 is submitted to no interference.

At a second step (block 82, Cause an interference of the field emitted by the antenna), subsequent to first step 81, an interference of the electromagnetic field radiated by array 1 is intentionally caused. This interference is for example caused by placing an object, a hand, etc. in the vicinity, for example, at a distance of a few centimeters or tens of centimeters, from array 1.

At a third step (block 83, Assess a radiation pattern Dp of the antenna submitted to the interference), subsequent to second step 82, a diagram Dp of the radiation emitted by array 1 is evaluated. Diagram Dp, resulting from a modification of diagram Di caused by the introduction of the interference at the previous step, is for example assessed as previously discussed in relation with step 74 of the method of FIG. 4. Data representative of diagram Dp are particularly obtained due to the antennas 32 of system 3. These data are for example temporarily stored in a volatile storage memory region of memory 20.

At a fourth step (block 84, Adjust the impedance values of the parasitic loads to restore diagram Di), subsequent to third step 83, one controls, via circuit 18, the reconfiguration of the load impedances 151, 153, and 155 connected to antenna elements 14 to restore, or to approach as much as possible, diagram Di. In other words, it is desired to reconfigure array 1 so that it emits, despite the presence of the interference, an electromagnetic field having a radiation pattern as close as possible to the diagram Di radiated by array 1 in the absence of interference.

At a fifth step (block 85, Record the impedance values enabling, based on diagram Dp, to restore diagram Di), subsequent to fourth step 84, the parameters enabling, when radiation pattern Dp is detected by the antennas 32 or device 3, to restore radiation pattern Di, are stored. The storage of the parameters is for example performed in a non-volatile storage memory region of memory 20.

At a sixth step (block 86, Stop the interference and apply the impedance values enabling to obtain diagram Di in the absence of interference), subsequent to fifth step 85, the interference is removed (for example, the object, the hand, etc. are taken away from array 1) and the parameters enabling to obtain radiation pattern Di in the absence of interference are applied. For this purpose, parameters identical to those of first step 81 are for example applied.

The steps 81 to 86 of the method are for example repeated by varying the type of interference, the position of the interfering element (object, hand, etc.) with respect to array 1, the radiation pattern Di which is desired to be obtained, etc. Generally, it is desired to apply interferences representative of situations likely to occur during the use of array 1. There is thus formed, in memory 20 of the array, a lookup table between, on the one hand, reference data representative of the radiation pattern of array 1 when it is submitted to different interferences and, on the other hand, parameters, or reference impedance values, enabling to restore or to approach diagram Di in the absence of interference.

As a variant, it may be provided for all or part of the data representative of the radiation patterns and of the parameters stored in memory 20 of the system to be obtained by simulation, for example, by simulating an impact of different interferences on the radiation pattern of array 1 and then by determining, by calculation, correction parameters enabling to come down to diagram Di for each of these interferences.

Figure 7:
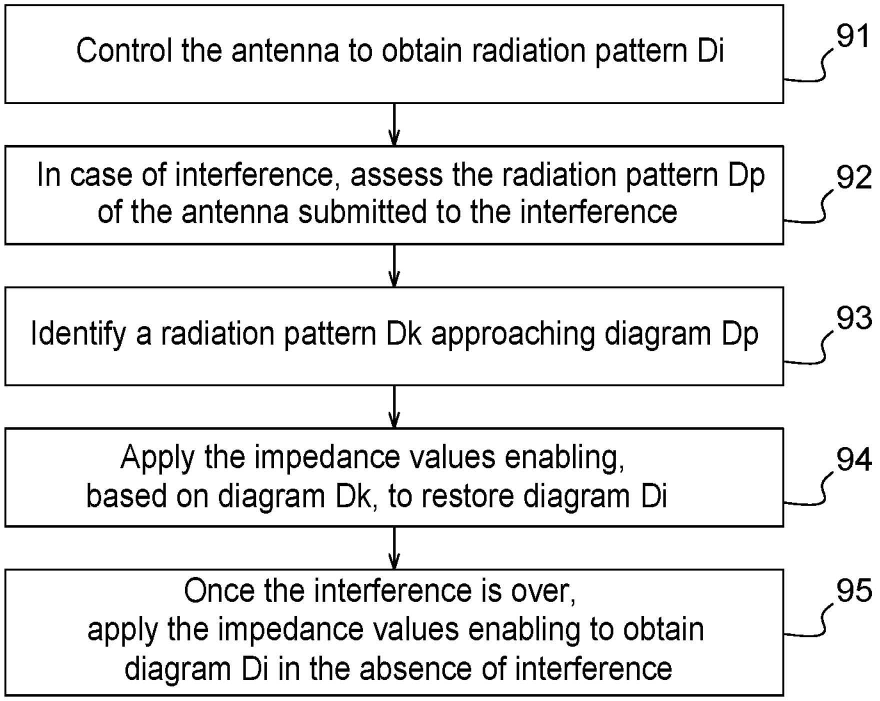
FIG. 7 is a diagram illustrating an implementation mode of a method of adjustment, in case of interference, of a field emitted by the antenna system of FIG. 3.

FIG. 7 is a diagram illustrating an implementation mode of a method of adjustment, in case of interference, of a field emitted by the antenna system of FIG. 3. As an example, a non-volatile storage memory region of memory 20 (FIG. 3) stores program code instructions which, when they are executed by processing unit 1834, allow the implementation of this method.

At a first step (block 91, Control the antenna to obtain radiation pattern Di), antenna 12 is controlled (FIG. 1) so that array 1 emits an electromagnetic field having the radiation pattern Di previously described in relation with FIG. 6. Diagram Di for example corresponds to a situation where the field emission, by array 1, is submitted to no interference.

At a second step (block 92, In case of interference, assess the radiation pattern Dp of the antenna submitted to the interference), subsequent to first step 91, a case where array 1 is submitted to an interference is considered. Array 1 then emits an electromagnetic field having radiation pattern Dp. For simplification, the case where the interference present at step 92 is similar to the interference intentionally applied at step 82 of the method of FIG. 6, and where the diagram Dp of step 92 corresponds to the diagram Dp of step 83 of FIG. 6, is considered. However, the following steps are easily adaptable by those skilled in the art to a case where the interference is different from that of step 82 and where diagram Dp is different from that of step 83.

At a third step (block 93, Identify a radiation pattern Dk approaching diagram Dp), subsequent to second step 92, a radiation pattern Dk identical or as close as possible to diagram Dp is searched for and identified. As an example, processing unit 1834 scans the content of memory 20 for data representative of diagram Dk approaching at best the data representative of diagram Dp. Diagram Dk for example forms part of a set of radiation patterns previously recorded into memory 20 of the system, for example, at the implementation of the method of FIG. 6 for different interferences, having impedance values of the loads 15 of array 1 corresponding thereto.

At a fourth step (block 94, Apply the impedance values enabling, based on diagram Dk, to restore diagram Di), subsequent to third step 93, the parameters (impedance values) enabling, when radiation pattern Dk is detected by system 3, to restore diagram Di or to approach at best diagram Di are applied. These parameters associated with diagram Dk for example have been previously stored in memory 20 of the system at the implementation of the method of FIG. 6 in the case of an interference resulting in diagram Dk.

At a fifth step (block 95, Once the interference is over, apply the impedance values enabling to obtain diagram Di in the absence of interference), subsequent to fourth step 94, it is assumed that the interference has disappeared (for example, the object, the hand, etc. has moved away from array 1). The parameters enabling to obtain radiation pattern Di in the absence of interference are then applied. For this purpose, parameters identical to those of first step 91 are for example applied.

An advantage of the methods previously-described in relation with FIGS. 6 and 7 lies in the fact that they allow a decrease of the adaptation time of array 1 in case of an interference. This results in a better capacity of transmission and/or reception by array 1 despite the presence of interferences.

Various embodiments and variants have been described. Those skilled in the art will understand that certain features of these various embodiments and variants may be combined, and other variants will occur to those skilled in the art. In particular, the system dimensions and the spacings between antennas depend on the application and particularly on the frequency of the system. Similarly, the number of antenna elements 12, 14 of array 1 and the number of antennas 32 of device 3 depend on the application.

Further, although this has not been described in detail, the adaptation of the described embodiments and implementation modes to the variant where the impedances 151, 153, and 155 of all or part of configurable loads 15 are replaced with a single component having a variable impedance is within the abilities of those skilled in the art.

Finally, the practical implementation of the described embodiments and variants is within the abilities of those skilled in the art based on the functional indications given hereabove. In particular, the selection of the arrangement of the antenna elements of array 1 and of the antennas 32 of device 3 depends on the application. Those skilled in the art are in particular capable of arranging the antennas 32 of device 3 so as to assess the field emitted in directions where it is desired to radiate with a maximum intensity and/or in directions where it is desired to radiate with a minimum, or even substantially zero, intensity.

Further, the adaptation of the described system to an antenna system where the array of antenna elements comprises a plurality of antennas transmitting with amplitude and phase weighting coefficients which are a function of the desired radiation pattern is within the abilities of those skilled in the art.

What is claimed is:

1. Antenna system comprising:

a transmitting or receiving antenna element;

an array of parasitic antenna elements individually associated with reconfigurable loads;

a plurality of near-field antennas; and a circuit for setting the configuration of the array of parasitic antenna elements according to a radiation picked up by the near-field antennas during a radio frequency transmission by the transmitting or receiving antenna element, wherein the circuit is configured to adjust impedance values of the reconfigurable loads according to a comparison, with reference data representative of radiation patterns of the system in the presence of interferences, of data representative of a radiation pattern of the system, and wherein each near-field antenna is coupled to an electronic circuit for assessing near-field radiation.

2. The system according to claim 1, wherein the spacing between two antenna elements selected from the transmitting or receiving antenna element, on the one hand, and the parasitic antenna elements, on the other hand, is smaller than one quarter of the wavelength of the central frequency of the bandwidth for which the array is intended.

3. The system according to claim 1, wherein the spacing between each near-field antenna and a closest antenna element is smaller than one tenth of the wavelength of the central frequency of the bandwidth for which the array is intended, wherein the closest antenna element is selected from the transmitting and receiving antenna element and the parasitic antenna elements.

4. The system according to claim 1, comprising exactly eight parasitic antenna elements equidistant from the transmitting or receiving antenna element and distributed every 45° around said element.

5. The system according to claim 1, wherein the transmitting or receiving antenna element and the array of parasitic antenna elements individually associated with the reconfigurable loads form part of a reconfigurable array of antenna elements.

6. A method of configuration of the antenna system of claim 1, comprising the following steps:

a) identifying, from among a set of reference data, the reference data representative of the radiation patterns of the system in the presence of interferences which are the closest possible to the data representative of the radiation pattern of the system; and b) adjusting the impedance values of the reconfigurable loads according to the identified reference data.

7. The method according to claim 6, wherein, at step b), the impedance values of the reconfigurable loads are adjusted to reference values associated with the reference data identified at step a).

8. The method according to claim 6, further comprising, prior to step a), a step of recording of the reference data in a memory.

* * * * *